United States Patent
Barad et al.

(10) Patent No.: US 11,277,367 B2
(45) Date of Patent: *Mar. 15, 2022

(54) DATA CENTRIC MESSAGING

(71) Applicant: Airbus Operations Limited, Bristol (GB)

(72) Inventors: Kayvon Barad, Bristol (GB); Anand Pavaskar, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,989

(22) Filed: Nov. 23, 2020

(65) Prior Publication Data
US 2021/0075756 A1    Mar. 11, 2021

Related U.S. Application Data

(63) Continuation of application No. 16/018,562, filed on Jun. 26, 2018, now Pat. No. 10,848,450.

(30) Foreign Application Priority Data

Jun. 29, 2017  (GB) ..................... 1710386

(51) Int. Cl.
*G06F 15/16* (2006.01)
*H04L 51/18* (2022.01)
(Continued)

(52) U.S. Cl.
CPC .............. *H04L 51/18* (2013.01); *H04L 67/12* (2013.01); *H04L 69/22* (2013.01)

(58) Field of Classification Search
CPC ......... H04L 51/18; H04L 69/22; H04L 67/12; H04L 69/26; H04L 12/40; H04L 2012/4028
See application file for complete search history.

(56) References Cited

U.S. PATENT DOCUMENTS 6,334,081 B1    12/2001  Robinson et al.
6,985,958 B2 *   1/2006  Lucovsky ........... G06F 21/6218
                                                    709/230
(Continued)

FOREIGN PATENT DOCUMENTS

EP    2 651 091      10/2013
WO    01/95137       12/2001
(Continued)

OTHER PUBLICATIONS

European Search Report cited in 18180157.2 dated Nov. 26, 2018, 9 pages.

(Continued)

*Primary Examiner* — Cheikh T Ndiaye
(74) *Attorney, Agent, or Firm* — Nixon & Vanderhye P.C.

(57) ABSTRACT

An avionics system including a first node and a second node wherein the first node is arranged to transmit a data message having: a data identifier, dynamic metadata associated with the data identifier and data content to the second node; wherein the second node is arranged to receive the data message from the first node and to: locate and read the data identifier within the data message; locate and read the dynamic metadata associated with the read data identifier; and retrieve data content from the determined position in the data message, wherein the data message contains multiple data identifiers, each with associated dynamic metadata and associated data content, and the second node is arranged only to locate and read the data identifier and dynamic metadata and retrieve data content in relation to a subset of the plurality of data identifiers.

11 Claims, 9 Drawing Sheets

(51) Int. Cl.
*H04L 69/22* (2022.01)
*H04L 67/12* (2022.01)

(56) References Cited

U.S. PATENT DOCUMENTS

| | | | |
|---|---|---|---|
| 8,909,158 B2 * | 12/2014 | O'Connor | G08G 5/0008 |
| | | | 455/66.1 |
| 2005/0190760 A1 * | 9/2005 | Scherer | H04L 12/413 |
| | | | 370/389 |
| 2008/0074276 A1 | 3/2008 | Valencia et al. | |
| 2010/0195491 A1 * | 8/2010 | Gray | H04L 47/10 |
| | | | 370/230 |
| 2011/0296379 A1 * | 12/2011 | McCready | G06F 9/448 |
| | | | 717/121 |
| 2013/0311140 A1 | 11/2013 | Schechter | |
| 2014/0177630 A1 | 6/2014 | Wang et al. | |
| 2015/0103735 A1 * | 4/2015 | Bobrek | H04B 7/18506 |
| | | | 370/316 |
| 2015/0106537 A1 * | 4/2015 | Bobrek | H04L 12/40169 |
| | | | 710/54 |
| 2015/0189660 A1 | 7/2015 | Morioka | |
| 2015/0223286 A1 | 8/2015 | Linscott et al. | |
| 2015/0381738 A1 | 12/2015 | Azuma et al. | |
| 2016/0088601 A1 | 3/2016 | Liu et al. | |
| 2016/0176512 A1 * | 6/2016 | Pangilinan | G08G 5/0021 |
| | | | 701/3 |
| 2016/0293014 A1 * | 10/2016 | Gomez | H04L 67/12 |
| 2017/0279752 A1 * | 9/2017 | Pierce | G06Q 10/00 |
| 2017/0295031 A1 * | 10/2017 | Bush | H04L 45/70 |

FOREIGN PATENT DOCUMENTS

| | | |
|---|---|---|
| WO | 2009/156820 | 12/2009 |
| WO | 2015/070140 | 5/2015 |
| WO | 2017/004229 | 1/2017 |

OTHER PUBLICATIONS

Search Report for GB 1710386.2 dated Dec. 8, 2017, 2 pages.
Search Report for GB 1710386.2 dated Mar. 19, 2018, 2 pages.

* cited by examiner

200

| UID | Descriptor | UNIT |
|---|---|---|
| Data 1 ID | Voltage at location X | mV |
| Data 2 ID | Voltage at location Y | V |
| Data 3 ID | Temperature at location Y | K |
| Data 4 ID | Time interval at location Z | s |
| ... | ... | ... |
| 5287 | Voltage at control unit | mV |

FIGURE 3

DATA CENTRIC MESSAGING

RELATED APPLICATIONS

This application is a continuation of U.S. patent application Ser. No. 16/018,562, filed Jun. 26, 2018, (now U.S. Pat. No. 10,848,450), and claims priority to United Kingdom patent application GB 1710386.2 filed Jun. 29, 2017, the entirety of which applications are incorporated by reference.

FIELD OF THE INVENTION

The present invention relates to the communication of data in a computer network. In particular, but not exclusively, the invention relates to the communication of data in an avionics network.

BACKGROUND OF THE INVENTION

Computer networking is largely focused on message based networks, whereby identifiers for the message are used to determine the handling of the message for both routing and/or consumption/processing of the message. In such networks, data is accessed at nodes based on a fixed format/structure of the content of a message, e.g., the message is addressed by a message ID and fixed offset within the message. Consequently, any change in an offset, the order or length of any data items within a message will impact a system that is using this message. This means that in order to make a single, seemingly minor, change to the message, multiple changes at multiple nodes (though possibly only at the application level) and significant testing (generally known as coupling) is required in order to reconcile the differences arising from the change. In a safety-critical context, such as avionics, processing such changes can be highly time consuming and economically costly to the extent that processing such changes is prohibitive.

In message based networks each node can only understand data correctly if it is in the expected format. This also means that it is important that the correct messages are sent to, and only to, the correct nodes. If a node receives a message intended for a different node then it may be in a different fixed format and the data will consequently be read incorrectly and could lead to false data entries at the receiving end. Consequently, sophisticated routing protocols are required to ensure that messages are sent only to the right places. This places a processing burden on the node sending the message and the node receiving the message, with interfaces being needed for multiple layers of communication protocol. The routing information also increases the total data size of each message, thereby increasing the bandwidth requirements of the network. In a some environmental contexts, such as avionics, processing capabilities and bandwidth are limited and additional burdens such as those described above can significantly affect the performance of an avionics system. Further, the use of a specific format for routing a message means that any changes to that message impact on whether or not it reaches its destination and whether or not it is correctly processed.

The use of a fixed format or structure of content of a message means that any recipient node that is intended to receive the message must be capable of processing the message in that format. Any changes to the format require all nodes sending and receiving the message to be aware of how to handle the changed format.

There are new communication systems that have recently emerged, such as Data Distribution Services (DDS), Named Data Networking (NDN) and Content Centric Networking (CCN), which have started to consider the use of data centric communication. In such systems, information on the content of a message and how to interpret it (for example, the data format, encoding, ranges and other qualities of service) are described in part of the message. These standards ordinarily support a single datum per message, which may be a fragment of a large file, video or data stream. Real-time systems, such as avionic systems, typically work using small data and primitive types, such as single integers or even individual Booleans coming from sensors or commanding actuators. Therefore the use of relatively large amounts of metadata in a message to describe relatively small amounts of content data means that these recently developed standards, like DDS, NDN and CCN require a much greater bandwidth in order to send relatively small amounts of information, when compared with the bandwidth require to perform the same communications in a message based network. The required bandwidth may be as much as 200 times greater than currently required to perform the same communications in a message based network.

Furthermore, the routed message must contain all of the information that allows for the message to be interpreted. Consequently, in systems that require frequent updates, the same information is repeatedly transmitted, which increases the processing burden of the system.

So far, these recently developed standards (e.g., DDS. NDN, CCN) are also heavily reliant on having a routing and discovery mechanism supported by the network (e.g. an Ethernet internet). Such mechanisms are not generally available in all types of network, such as an aircraft network, due to certification challenges.

Known types of data centric communication generally include metadata in a textual form, usually in XML which may lead to slower processing of the information and additional, non-value adding, syntactic data is repeatedly sent across the network. Consequently, because of this, in excess of 100 bytes must be processed before it can even be interpreted. In addition, these known standards have features which rely on complex algorithms to achieve communication. These algorithms and features are difficult to test for high integrity systems and while they are necessary for the implementation, they are not necessary for the objective of the system using it.

SUMMARY OF THE INVENTION

In order to at least mitigate some of the above problems, there is provided: an aircraft comprising an avionics system comprising a first node and a second node wherein the first node is arranged to transmit a data message comprising: a data identifier, dynamic metadata associated with the data identifier and data content to the second node; wherein the second node is arranged to receive the data message from the first node and in response to receiving the data message from the first node, the second node is arranged to: locate and read the data identifier within the data message; locate and read the dynamic metadata associated with the read data identifier; and retrieve data content from the determined position in the data message, wherein the data message contains multiple data identifiers, each with associated dynamic metadata and associated data content, and the second node is arranged only to locate and read the data identifier and dynamic metadata and retrieve data content in relation to a subset of the plurality of data identifiers, such that data content associated with one or more data identifiers that are not part of the subset is not processed.

There is also provided: a computer implemented method of receiving data, the method comprising: receiving a data message (at a node); locating and reading a data identifier within the data message; locating and reading dynamic metadata associated with the read data identifier, within the data message; using the dynamic metadata to determine the position in the data message of data content associated with the read data identifier; and retrieving data content from the determined position in the data message; wherein the data message contains multiple data identifiers, each with associated dynamic metadata and associated data content, and the method further comprises only performing the locating, reading and retrieving steps in relation to a subset of the plurality of data identifiers, such that data content associated with one or more data identifiers that are not part of the subset is not processed.

There is also provided: a computer implemented method of receiving data, the method comprising: receiving a data message (at a node); locating and reading a data identifier within the data message; locating and reading dynamic metadata associated with the read data identifier, within the data message; using the dynamic metadata to determine the position in the data message of data content associated with the read data identifier; retrieving data content from the determined position in the data message; and retrieving static metadata corresponding to the data identifier, thereby to interpret the retrieved data content.

There is also provided: a computer implemented method of transmitting data, the method comprising: writing a data identifier associated with static metadata, at a first position in a data message; writing data content associated with the data identifier and/or static metadata at a second position in a data message; writing dynamic metadata associated with the data content within the data message, the dynamic metadata including the second position so that it the dynamic metadata is usable to locate the data content; and transmitting the data message.

There is also provided: a node configured to receive data, the node comprising: a processor; a memory; and a communication interface, wherein the node is configured to: receive a data message via the communication interface; and at the processor: locate and read dynamic metadata associated with the read data identifier, within the data message; use the dynamic metadata to determine the position in the data message of data content associated with the read data identifier; retrieve data content from the determined position in the data message; and retrieve static metadata from the memory corresponding to the data identifier, thereby to interpret the retrieved data content.

There is also provided: a node configured to receive data, the node comprising: a processor; a memory; and a communication interface, wherein the node is configured to: receive a data message via the communication interface; and at the processor: locate and read dynamic metadata associated with the read data identifier, within the data message; use the dynamic metadata to determine the position in the data message of data content associated with the read data identifier; and retrieve data content from the determined position in the data message; wherein the data message contains multiple data identifiers, each with associated dynamic metadata and associated data content, and the method further comprises only performing the locating, reading and retrieving steps in relation to a subset of the plurality of data identifiers, such that data content associated with one or more data identifiers that are not part of the subset is not processed.

There is also provided a node configured to transmit data, the node comprising: a processor; a communication interface, wherein the node is configured to: write a data identifier associated with static metadata, at a first position in a data message; write data content associated with the data identifier and/or static metadata at a second position in a data message; write dynamic metadata associated with the data content within the data message, the dynamic metadata including the second position so that it the dynamic metadata is usable to locate the data content; and transmit the data message.

There is also provided: structured data comprising: a data identifier; dynamic metadata associated with the data identifier; and data content, wherein the position of the data content in the data indexing table is based on the dynamic metadata, wherein the structured data having a fixed format, thereby to enable efficient retrieval of the data content at a node to which the structured data is receivable.

There is also provided: a computer implemented method for communication in an avionics network comprising: transmitting, from a first node to a second node, a data message comprising a data identifier, dynamic metadata associated with the data identifier and data content; receiving, at the second node from the first node, the data message; at the second node: locating and reading the data identifier within the data message; locating and reading the dynamic metadata associated with the read data identifier; and retrieving data content from the determined position in the data message, wherein the data message contains multiple data identifiers, each with associated dynamic metadata and associated data content, and the method further comprises only performing the locating, reading and retrieving steps in relation to a subset of the plurality of data identifiers, such that data content associated with one or more data identifiers that are not part of the subset is discarded.

There is also provided: a computer implemented method for communication in an avionics network comprising: transmitting, from a first node to a second node, a data message comprising a data identifier, dynamic metadata associated with the data identifier and data content; receiving, at the second node from the first node, the data message; at the second node: locating and reading the data identifier within the data message; locating and reading the dynamic metadata associated with the read data identifier; retrieving data content from the determined position in the data message; and retrieving static metadata corresponding to the data identifier, thereby to interpret the retrieved data content.

There is also provided: an aircraft comprising an avionics system comprising a first node and a second node wherein the first node is arranged to transmit a data message comprising: a data identifier, dynamic metadata associated with the data identifier and data content to the second node; wherein the second node is arranged to receive the data message from the first node and in response to receiving the data message from the first node, the second node is arranged to: locate and read the data identifier within the data message; locate and read the dynamic metadata associated with the read data identifier; and retrieve data content from the determined position in the data message; and retrieve static metadata corresponding to the data identifier, thereby to interpret the retrieved data content.

BRIEF DESCRIPTION OF THE DRAWINGS

Embodiments of the invention will now be described with reference to the accompanying drawings, in which:

FIG. 3 shows a static metadata look up table in accordance with an embodiment of the invention;

DETAILED DESCRIPTION OF EMBODIMENT(S)

Further aspects of the invention will become apparent from the appended description and claims.

A data centric message format (DCMF) of the present invention minimises the number of required features for real-time networks, including relatively small networks. DCMF has a greater efficiency than existing message formats, requires less network overhead than other flexible format concepts, achieves a decoupled flexibility and can be agnostic to any underlying network technology, provided the network can distribute the data. Data communication using the data centric message format of the present invention can be implemented on a computer network on an aircraft, such as the network 10 of FIG. 1A or FIG. 1B.

Figure 1A:
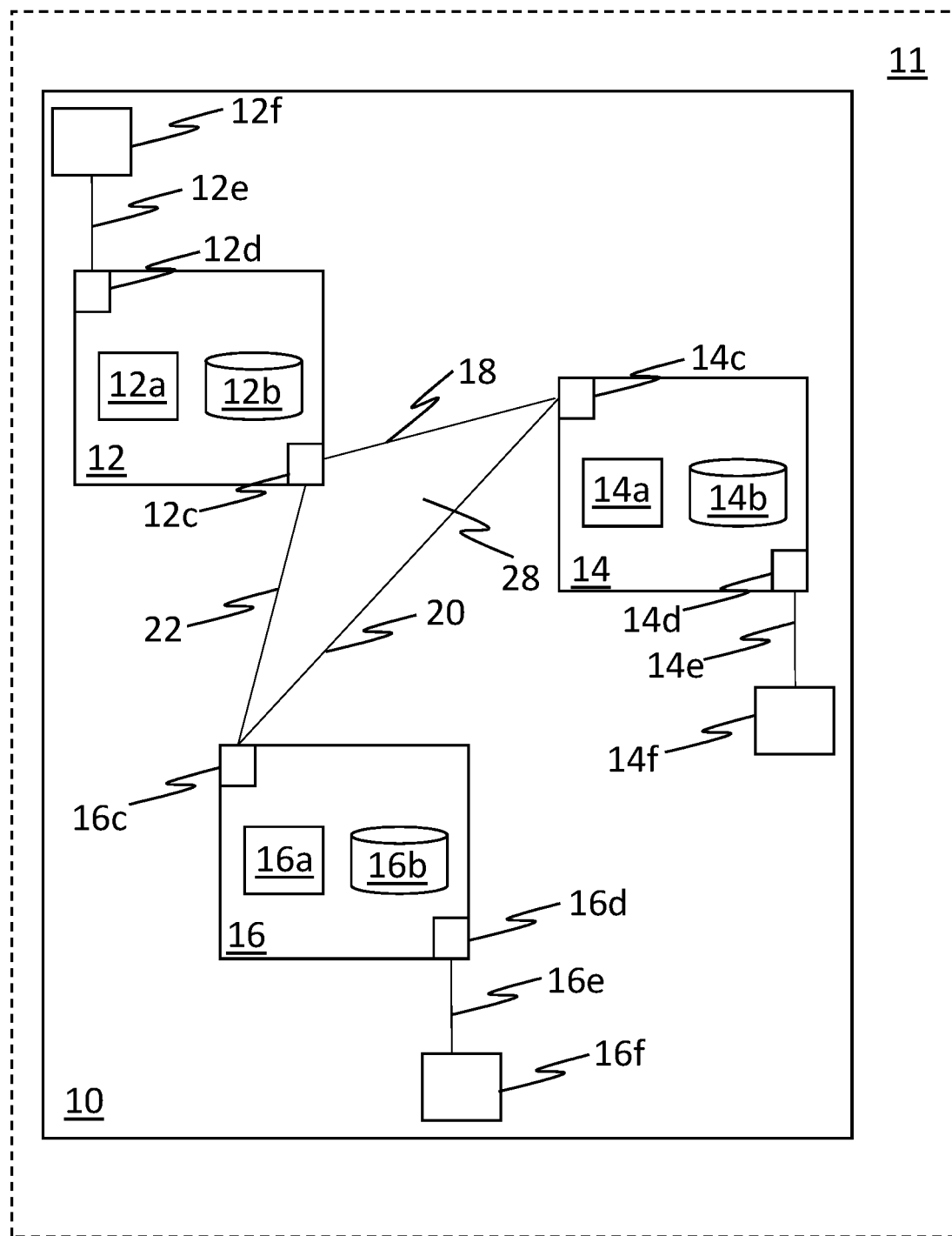
FIG. 1A shows an aircraft with an avionics data network in accordance with an embodiment of the invention.

FIG. 1A shows an aircraft 11 having an avionics computer network 10 having three nodes 12, 14, 16. Each of the first node 12, second node 14 and the third node 16, have a processor 12a, 14a, 16a, respectively and a memory 12b, 14b, 16b, respectively. Further, each of the first node 12, second node 14, and third node 16 have a first communication interface 12c, 14c, 16c, and a second communication interface 12d, 14d, 16d, respectively. Each of the second communication interfaces 12d, 14d, 16d is connected via a communication link 12e, 14e, 16e to an external device 12f, 14f, 16f, respectively. Furthermore, as shown at FIG. 1, the first node 12 is in communication with the second node 14 via a communication path 18 between the first communication interface 12c of first node 12 and the first communication interface 14c of the second node 14. The second node 14 is also in communication with the third node 16 via communication path 20 between the first communication interface 14c of the second node 14 and first communication interface 16c of the third node 16. The first node 12 is also in communication with the third node 16 via communication path 22 between the first communication interface 12c of the first node 12 and the first communication interface 16c of the third node 16.

Figure 1B:
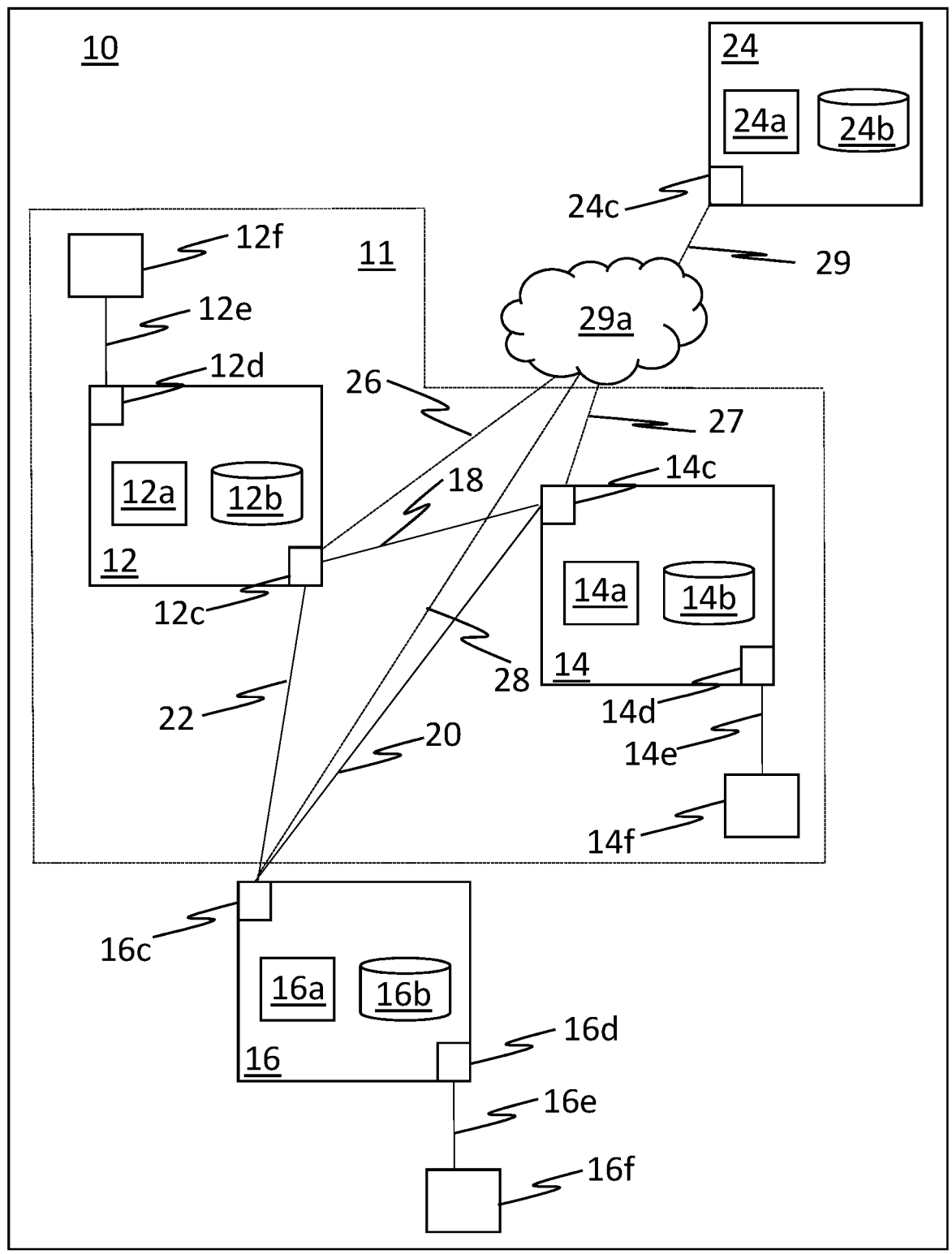
FIG. 1B shows an aircraft with an avionics a data network in accordance with an embodiment of the invention.

FIG. 1B shows an example of distributed computing including an aircraft 11 and an avionics data network 10. There is shown three nodes 12, 14, 16 and a UID server 24. Two of the three nodes 12, 14 are shown as part of the aircraft 11. The third node 16 is outside of the aircraft 11. The server 24 is shown to be external to the aircraft 11. Each of the first node 12, second node 14 and the third node 16, have a processor 12a, 14a, 16a, respectively and a memory 12b, 14b, 16b, respectively. Further, each of the first node 12, second node 14, and third node 16 have a first communication interface 12c, 14c, 16c, and a second communication interface 12d, 14d, 16d, respectively. Each of the second communication interfaces 12d, 14d, 16d is connected via a communication link 12e, 14e, 16e to an external device 12f, 14f, 16f, respectively. Furthermore, as shown at FIG. 1, the first node 12 is in communication with the second node 14 via a communication path 18 between the first communication interface 12c of first node 12 and the first communication interface 14c of the second node 14. The second node 14 is also in communication with the third node 16 via communication path 20 between the first communication interface 14c of the second node 14 and first communication interface 16c of the third node 16. The first node 12 is also in communication with the third node 16 via communication path 22 between the first communication interface 12c of the first node 12 and the first communication interface 16c of the third node 16. The server 24 has a processor 24a and a memory 24b. The UID server 24 also has an interface 24c that can be used to communicate with the first communication interface 12c of the first node 12, the first communication interface 14c of the second node 14 or the first communication interface 16c of the third node 16, over communication paths 26, 27 and 28, 29 and the network 29a.

The server 24 is shown to communicate with the nodes 12, 14, 16 of the avionics data system on the aircraft 11 via the network 29a. Alternatively, the server 24 is an integral part of the aircraft 11. The server 24 is shown to communicate with the nodes 12, 14, 16 via wired communication paths 26, 27, 28, 29. However, alternatively the communication paths 26, 27, 28, 29 may be formed of any combination of wired or wireless communication paths. For example, the aircraft 11 may be connected to a server 24 using wired means in order to exchange information. Alternatively, the aircraft may be connected wirelessly to server 24 in order to exchange information.

Whilst the third node 16 is shown to be external to the aircraft 11, alternatively, the third node 16 may be positioned on or in the aircraft 11.

In the examples of FIG. 1A and of FIG. 1B, the external device 12f of the first node 12 is an apparatus having a display that provides a visual output for a user, as well as the means to input information, to determine and control the status of any system within the network 10. For example, the external device 12f displays information relating to the external device 14f of the second node 14 and the external device 16f of the third node 16. The external devices 14f, 16f of the second node 14 and the third node 16, respectively are monitoring equipment (e.g. avionic sensors) that provide data for analysis at the first node 12. Data may be communicated between the first node 12, the second node 14, and the third node 16 using a data indexing table, as described with reference to FIG. 2.

In the example of FIGS. 1A and 1B there are three nodes 12, 14, 16. In further examples, the number of nodes in the network 10 is not limited. The nodes 12, 14, 16 are each shown to have a first communication interface 12c, 14c, 16c and a second communication interface 12d, 14d, 16d, however, in further examples, the nodes 12, 14, 16 may have any number of communication interfaces. The communication interfaces 12c, 14c, 16c, 12d, 14d, 16d may be implemented using software or hardware. The communication paths 18, 20, 22 of FIGS. 1A and 1B are wired communication paths, however, alternatively, the communication paths may be wireless, wired, or a combination of both wired and wireless paths. Alternatively, or additionally, the communication paths 18, 20, 22 are direct memory (DMA) transfer paths, in the case of a software-defined network, e.g., multicore interconnects, PCI express.

In the example of FIGS. 1A and 1B, the three nodes 12, 14, 16 are physical nodes, such a network chips or cards. Alternatively, the three nodes 12, 14, 16 may be virtual nodes, such as middleware, where the processor and memory are shared parts of a computer and the communication interfaces 12c, 14c, 16c are network devices or drivers. In the example of FIGS. 1A and 1B, the communication paths 18, 20, 22 enable communication between physically distinct entities. Alternatively, communication paths 18, 20, 22 enable intra-software communication paths within the same computer. For example, the communication paths are via memory exchange and connect two or more different pieces of software together.

In the example of FIGS. 1A and 1B, the nodes 12, 14, 16 are configured to communicate with associated applications that form part of the nodes 12, 14, 16. However, alternatively, the applications are decoupled from the nodes 12, 14, 16. As such, operation of the nodes 12, 14, 16 is independent of the operation of the applications, whilst the applications are dependent on the nodes 12, 14, 16.

In the example of FIGS. 1A and 1B, the nodes 12, 14, 16 are distributed internally within the aircraft 11. However, alternatively, the nodes are distributed at the necessary locations that are internal or external to the aircraft 11, thereby to enable one or more parameters to be monitored. Whilst the external devices 12f, 14f, 16f are shown to be located within in the aircraft 11, the external devices 12f, 14f, 16f may be integrated with first node 12, the second node 14 or the third node 16, respectively, or, alternatively or additionally, the external devices are located remotely from the nodes 12, 14, 16, in order to monitor parameters internally or externally as part of the avionics system of the aircraft 11.

In the example of FIGS. 1A and 1B, the external device 12f is an apparatus with a display and input means, however, alternatively, the external device 12f may provide any usable output, such as an alarm. The external device 12f may be integrated with the first node 12. Similarly the external devices 14f and 16f of the second node 14 and the third node 16 may be integrated with the second node 14 and the third node 16, respectively. Each of the nodes 12, 14, 16 shows a single external device 12f, 14f, 16f, however, alternatively, any node 12, 14, 16 may have any number of external devices e.g. multiples sensors and alternatively may not have any external devices.

In the example of FIG. 1B, the server 24 stores a UID look up table in the memory 24b. Each of the first node 12, the second node 14 and the third node 16 can access the UID look up table stored in the memory 24c of the server 24 in order to identify relevant information. Alternatively or additionally, the server 24 is configured to periodically synchronise with any of the nodes 12, 14, 16, thereby to provide the nodes 12, 14, 16 with relevant information that enables them to correctly interpret and send messages.

In the example of FIG. 1B there is one server 24. However, alternatively, there may be any number of servers, including no server, as described with reference to FIG. 1A. In the example of FIG. 1A, the communication network 10 does not have a UID server 24 and all information is stored directly on the nodes. The server 24 of FIG. 1B has one communication interface 24c, however, the server 24 may have any number of communication interfaces.

Figure 2:
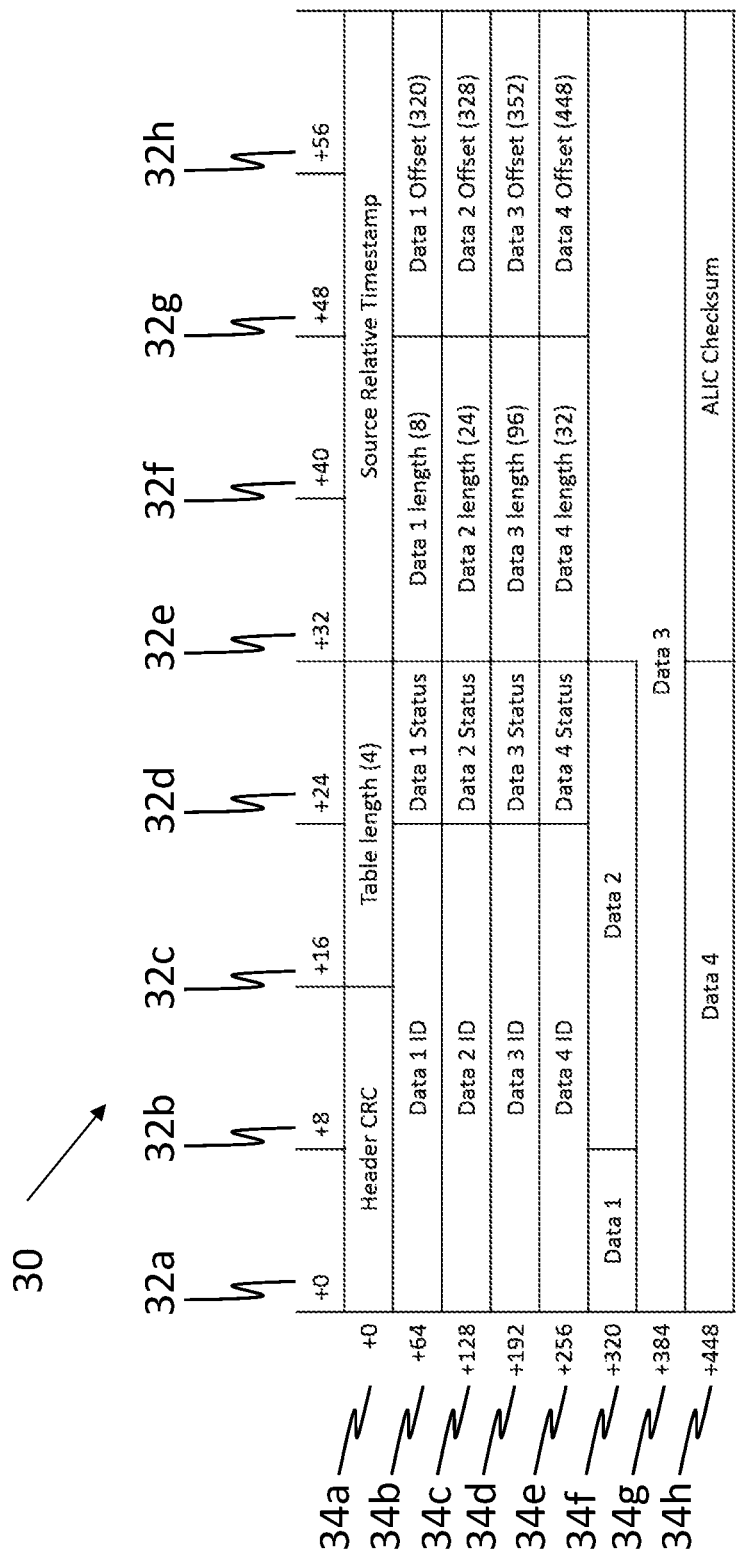
FIG. 2 shows a data indexing table in accordance with an embodiment of the invention.

FIG. 2 shows a data indexing table 30 as an example of a format of message in accordance with the invention. The data indexing table 30 is a single stream of data, illustrated as a fixed width table of data arranged in eight rows 34a, 34b, 34c, 34d, 34e, 34f, 3fg and 34h, each row being 64 bits long. For the purpose of describing the data indexing table 30, each row is referenced in respect of eight segments 32a, 32b, 32c, 32d, 32e, 32f, 32g and 32h, each segment being 8 bits (1 byte) in length. The first row 34a of the data indexing table 30 relates to a header for the data indexing table 30. The second row 34b, the third row 34c, the fourth row 34d and the fifth row 34e, relate to metadata of the data indexing table 30. The sixth row 34f, the seventh row 34g and the eighth row 34h relate to data of the data indexing table 30. The content of the exemplary data indexing table 30 of FIG. 2 is described in more detail, below.

In the example format of the data indexing table 30 of FIG. 2 the first row of data 34a represents the header of the message. The first 16 bits of row 34a are dedicated to a header Cyclic Redundancy Check (CRC) shown in segments 32a and 32b of the first row 34a of the data indexing table 30. The next 16 bits of first row 34a are dedicated to provide information relating to the table length and are shown at segments 32c and 32d of the first row 34a of the data index table 30. In the example of FIG. 2, there are four pieces of data: data 1, data 2, data 3 and data 4. Therefore the table length is 4. The final 32 bits of the first row 34a of the data indexing table 30 are dedicated to a source relative timestamp for the data. This is shown in segments 32e, 32f, 32g and 32h of the first row 34a of the data indexing table 30.

The second row 34b, the third row 34c, the fourth row 34d and the fifth row 34e of the data indexing table 30 contain dynamic metadata (metadata that may change from message to message) in respect of the data shown in rows 34f, 34g, and 34h of the data indexing table 30. In each of the first three segments 32a, 32b and 32c of the data indexing table 30 there is provided fixed data at rows 34b, 34c, 34d and 34e, of the data indexing table 30.

The second row 34b of the data indexing table 30 shows the first three segments 32a, 32b and 32c having a length of 24 bits of data relating to a unique identifier (UID) in respect of the first set of data, data 1.

The third row 34c of the data indexing table 30 shows the first three segments 32a, 32b and 32c having a length of 24 bits of data relating to a unique identifier (UID) in respect of the second set of data, data 2.

The fourth row 34d of the data indexing table 30 shows the first three segments 32a, 32b and 32c having a length of 24 bits of data relating to a unique identifier (UID) in respect of the third set of data, data 3.

The fifth row 34e of the data indexing table 30 shows the first three segments 32a, 32b and 32c having a length of 24 bits of data relating to a unique identifier (UID) in respect of the fourth set of data, data 4.

In the data indexing table 30 of FIG. 2, segments 32d, 32e, 32f, 32g and 32h of the second row 34b, the third row 34c, the fourth row 34d and the fifth row 34e relate to dynamic metadata that is represented by a corresponding UID, i.e. the UID in respect of the first set of data, data 1 represents the dynamic meta data in respect of data 1, the second set of data, data 2 represents the dynamic meta data in respect of data 2, the third set of data, data 3 represents the dynamic metadata in respect of data 3 and the fourth set of data, data 4 represents the dynamic meta data in respect of data 4.

The 8 bit segment 32d of the second row 34b, the third row 34c, the fourth row 34d and the fifth row 34e, of the data indexing table 30 relate to the statuses (e.g., validity or fault status) of data 1, data 2, data 3 and data 4, respectively.

Further dynamic metadata is shown at segments 32*e* and 32*f* of second row 34*b* of the data indexing table 30, which metadata relates to a length of data 1. The segments 32*g* and 32*h* of the second row of 34*b* of the data indexing table 30 relate to an offset value in respect of data 1. Similarly, segments 32*e* and 32*f* of third row 34*c* of the data indexing table 30, relate to dynamic metadata in respect of a length of data 2. The segments 32*g* and 32*h* of the third row of 34*c* of the data indexing table 30 relate to an offset value in respect of data 2. Also similarly, segments 32*e* and 32*f* of the fourth row 34*d* of the data indexing table 30 relate to dynamic metadata in respect of a length of data 3. The segments 32*g* and 32*h* of the fourth row of 34*d* of the data indexing table 30 relate to an offset value in respect of data 3. Finally, segments 32*e* and 32*f* of the fifth row 34*e* of the data indexing table 30 relate to dynamic metadata in respect of a length of data 4. The segments 32*g* and 32*h* of the fifth row of 34*e* of the data indexing table 30 relate to an offset value in respect of data 4.

The actual data carried in the message is provided at the sixth row 34*f*, seventh row 34*g* and the eight row 34*h* of the data indexing table 30. Data 1 is 8 bits in the length and positioned in a first segment 32*a* of the sixth row 34*f* of the data indexing table 30. Accordingly, the position of data 1 is at 320 bits in the data indexing table 30 (hence appearing in the sixth row 34*f* of a 64 bit fixed width table where there is a fixed number of bits per entry in the table, thereby making it faster to parse), which is the offset value shown at segments 32*g* and 32*h* of the second row 34*b* of the data indexing table 30.

Data 2 has an offset value of 328 bits and is positioned in segments 32*b*, 32*c*, and 32*d* of the sixth row 34*f* of the data indexing table 30. Data 2 has a length of 24 bits, as shown at segments 32*e* and 32*f* of the third row 34*c* of the data indexing table 30.

Data 3 has a length of 96 bits and an offset value of 352 bits. Accordingly data 3 is located in all of segments 32*e*, 32*f*, 32*g* and 32*h* of each of the sixth row 34*f* and seventh row 34*g* of the data indexing table 30 as well as at segments 32*a*, 32*b*, 32*c* and 32*d* of the seventh row 34*g* of the data indexing table 30.

Finally, data 4 has a length of 32 bits and an offset of 448 bits and is therefore located at segments 32*a*, 32*b*, 32*c* and 32*d* of the eighth row 34*h* of the data indexing table 30.

There is also shown a Cyclic Redundancy Check (CRC), 32 bits in length at segments 32*e*, 32*f*, 32*g* and 32*h* of the eighth row 34*h* of the data indexing table 30.

In the example of FIG. 2, the data indexing table 30 has a fixed width of 64 bits, however, alternatively, the data indexing table 30 may have any width. Further, the data indexing table 30 is shown to be 512 bits long, but, alternatively, may be of any length.

The data indexing table 30 is shown to have status data and data length information. However, alternatively, the data indexing table 30 need not include these with the data offset being sufficient. Alternatively, the data indexing table 30 includes only data length information. If the data indexing table 30 includes data length information then the position of the data can be inferred. Similarly, if the data indexing table 30 includes data offset information, data length can be inferred. The inclusion of both data offset and data length enables computational optimisation. Further, the table length field of segments 32*c* and 32*d* of the first row 34*a* of the data indexing table 30 and the Source Relative Timestamp information of the segments 32*e*, 32*f*, 32*g*, 32*h* of the first row 34*a* of the data indexing table 30 can optionally be excluded.

Whilst UIDs, data statuses, data lengths, data offsets, data, ALIC checksum, header CRC, table length and Source Relative Timestamp are shown to have particular lengths that are chosen to be optimal in the described embodiment, each of these fields may comprise more or less information.

FIG. 3 shows a UID look up table 200 stored on the server 24, in accordance with the arrangement of FIG. 1B. The look up table 200 has a first column 202 relating to unique identifiers, a second column 204 relating to a descriptor and a third column 206 relating to units. The look up table 200 describes five rows of data 208, 210, 212, 214, 216. The first column 202 at row 208 relates to the UID for data 1. The first column 202 at row 210 relates to the UID for data 2. The first column 202 at row 212 relates to the UID for data 3. The first column 202 at row 214 relates to the UID for data 4. The first column 202 at row 216 relates to a UID '5827'. Whilst FIG. 3 describes five rows of data 208, 210, 212, 214, 216, further rows of data can be included, as emphasised with the ellipses between the penultimate row 214 and the final row 216.

Whilst the look up table 200 is described as being stored on the server 24, in accordance with the arrangement of FIG. 1B, in an alternative embodiment, such as that described with reference to FIG. 1A, there is no server 24 and the look up table 200 is stored locally at a node, such as the first node 12.

The second column 204 and the third column 206 hold static metadata at each of the four rows 208, 210, 212, 214, 216. The static metadata is used to describe how to interpret data. Examples of static metadata include encoding (e.g. integer), scale, range and units (e g millivolts, ranging from 0 to 10V with a resolution of 1 millivolt), accuracy (e.g. +−2.5 mV), time and latency (e.g. acquired every 32 milliseconds, communication latency up to 16 ms), data meaning (e.g. voltage across one secondary coil of a differential transformer), how to turn the data into real meaning (e.g. (V1−V2)/(V1+V2)*90 gives an actuator rotation in degrees, where this data is V1 and V2 is the voltage across the other secondary coil), whether the data is correct and valid (e.g. messages received from communication port 62349, 4 bits starting from bit 128 of the payload). Data validity is dynamic and the positioning of the data is dynamic, as described above.

Each unique identifier of the first column 202 of the look up table 200 has corresponding static metadata in the second column 204 and the third column 206. When a node reads the first column 202 of the look up table 200, it locates a unique identifier of interest. The unique identifier of interest has corresponding static metadata which provides a descriptor of the data and the units of measurement that the data relating to the unique identifier are associated with. Therefore, in the example of FIG. 5, the Data 1 ID relates to the voltage at location X and is measured in mV, the Data 2 ID relates to the voltage at location Y and is measured in V, the Data 3 ID relates to the temperature at location Y and is measured in K, the Data 4 ID relates to a time interval at location Z and is measured in s and 5287 is a UID that relates to a voltage at a control unit, measured in mV.

Whilst FIG. 3 shows data six UIDs and fourteen pieces of static metadata, the look up table 200 may contain any amount of data. Further, whilst the format of the look up table 200 is shown in a tabular format, the format of the look up table 200 may be of any format that enables referencing static metadata based on a unique identifier. Alternatively a format such as this may be embedded on the node directly, embedded on a device associated with the node. Such a data base may exist separated from the network and only used as a reference or as part of the design process of software connected to the network (i.e. the knowledge about the data UIDs is a factor of the implementation of how the data is "consumed"). Whilst the descriptor of column 204 of look up table 200 provides a small amount of information, in further examples, the static metadata provides all of the information required in order to interpret the data and may be in machine optimised formats (e.g. binary representations), human readable formats (e.g. text), or formalised representations (such as structured tables or xml). Typically, the look up table 200 contains static metadata relating to many more UIDs than one node would ordinarily be interested in.

Figure 4:
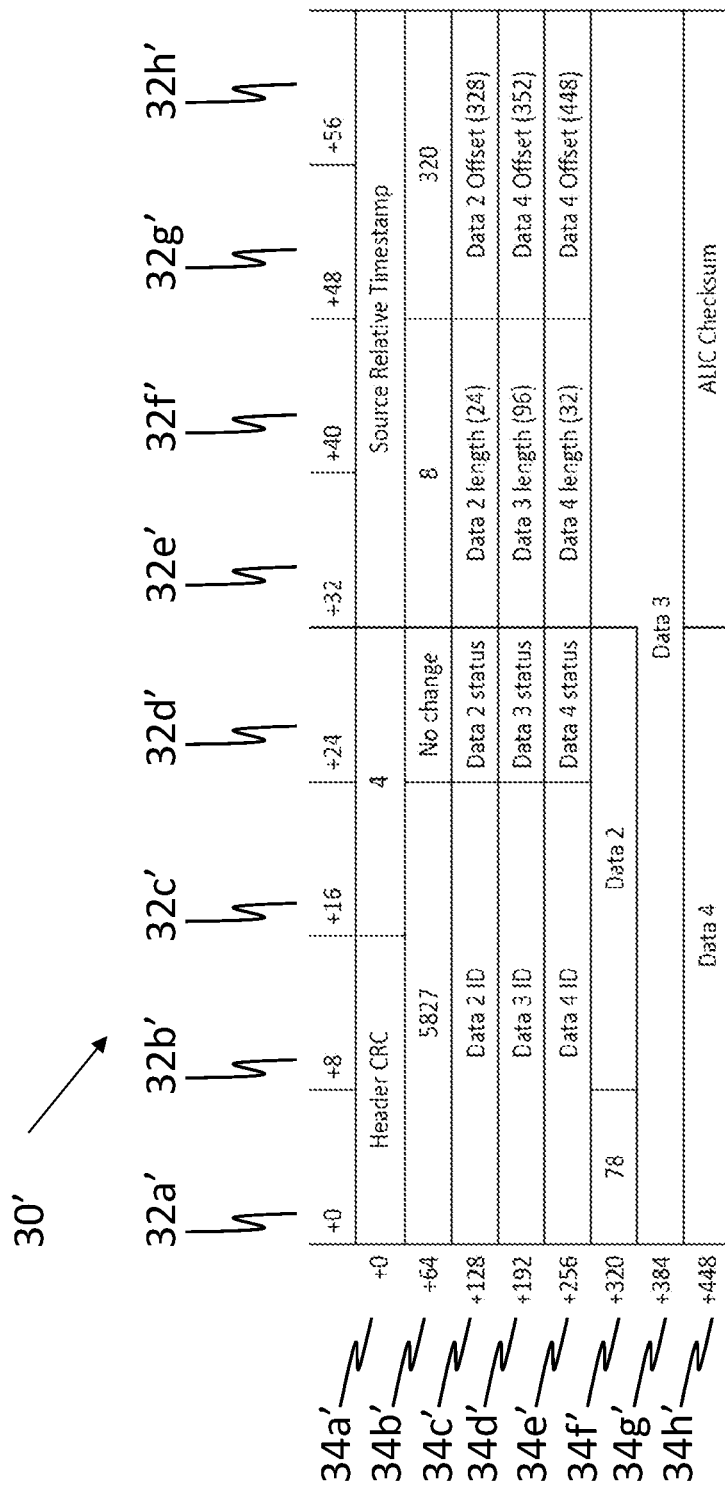
FIG. 4 shows a data indexing table in accordance with an embodiment of the invention.

FIG. 4 is a data indexing table 30', which is an example of the data indexing table 30 described above with reference to FIG. 2. Data indexing table 30' shows data measured from a control unit, and is used to illustrate how the implementation of data indexing tables described herein enables a node to retrieve and make sense of particular information.

Data indexing tables, such as data indexing table 30, may be implemented in avionics systems. In such avionics systems, data content is recorded at one or more locations in an avionics system, which may be one or more locations on or within an aircraft, or on or within multiple aircrafts, or at one or more locations within an airport or a flight control system. The data is shared between the one or more nodes at one or more locations in the avionics system. Beneficially, the data is sent without reliance on a particular format and the data can be filtered, as necessary, based on unique data identifiers within data messages. Data communication within an avionics system is described with reference to the flow diagrams of FIGS. 5A and 5B, below.

Figure 5A:
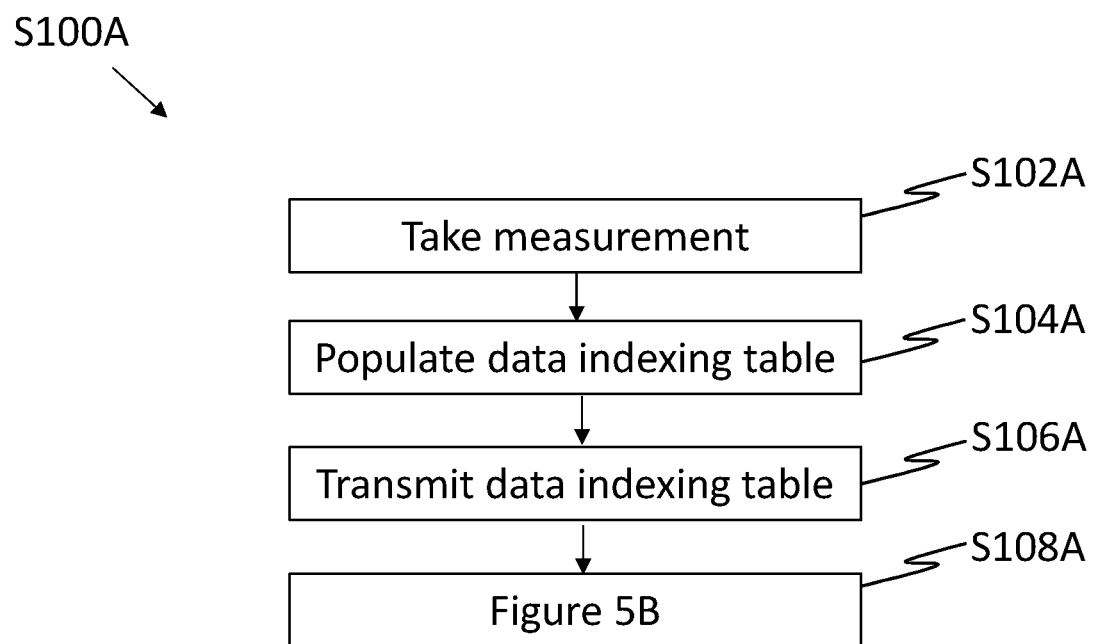
FIG. 5A is a flow diagram showing a process for measuring and transmitting data from a node.

FIG. 5A is a flow diagram S100A showing a process for recording and transmitting a message. The process of FIG. 5A is implemented at a node, such as the second node 14, described in relation to FIG. 1A or FIG. 1B. The process of FIG. 5A is implemented in an avionics system. In this example, the second node 14 has an external device 14f that is used to monitor a property within an avionics system, such as an internal or external property of an aircraft. The device 14f is monitoring equipment that includes a sensor that measures the voltage at the control unit 14 in the network 10. In an example, the sensor may measure a voltage that is a property of an aircraft wing, wheel, cabin or engine etc.

The process begins at step S102A. At step S102A, a voltage is measured by the device 14f of the second node 14. The voltage that is stored locally in the memory 14b of the second node 14 and is written into a data indexing table 30. The second node 14 writes a data indexing table 30, which in this example is the data indexing table 30' of FIG. 4, and stores it locally in the memory 14b of the second node 14.

Once a measurement has been taken at step S102A, the process moves to step S104A, where a data indexing table 30 is populated with the data measured at step S102A. In order to populate a data indexing table 30, a number of steps (not shown) are taken. The measurement taken at step S102A is associated with a unique identifier UID. In the example of FIG. 5A, the UID of interest is 5827, as described with reference to the data indexing table 30' of FIG. 4. The UID is recorded at the first three segments 32a', 32b', 32c' of the second row 34b' of the data indexing table 30'.

The dynamic metadata associated with the UID 5827 is recorded at the seventh segment 32g' and the eighth segment 32h' of the second row 34b' of the indexing table 30'. The dynamic metadata in the example of FIG. 4 is '320' and is the offset that describes the position in the data indexing table 30' of the data measured by the second node 14 at step S102A. Accordingly, the voltage data recorded at step S102A is located in the data indexing table 30' in segment 32a' of the sixth row 34f. In this example, the control unit measures a voltage of 78 mV. Therefore a value of '78' is stored as data in the data indexing table 30' at the appropriate location. The second node 14 populates the data indexing table 30' with information that it measures, which, alternatively or additionally, includes further information relating to other measurements or inputs.

Once the data indexing table 30' has been populated at step S104A of the process flow S100A, the process moves to step S106A, where the data indexing table 30', that is recorded by the processor 14a and stored locally in the memory 14b at the second node 14, is transmitted to one or more other nodes, such as the first node 12 and the third node 16, described above with reference to FIGS. 1A and 1B.

The process of FIG. 5A is followed by the receipt of the data indexing table 30' at one or more other nodes. The second node 14 repeats the process of FIG. 5A as many times and as frequently as necessary.

Figure 5B:
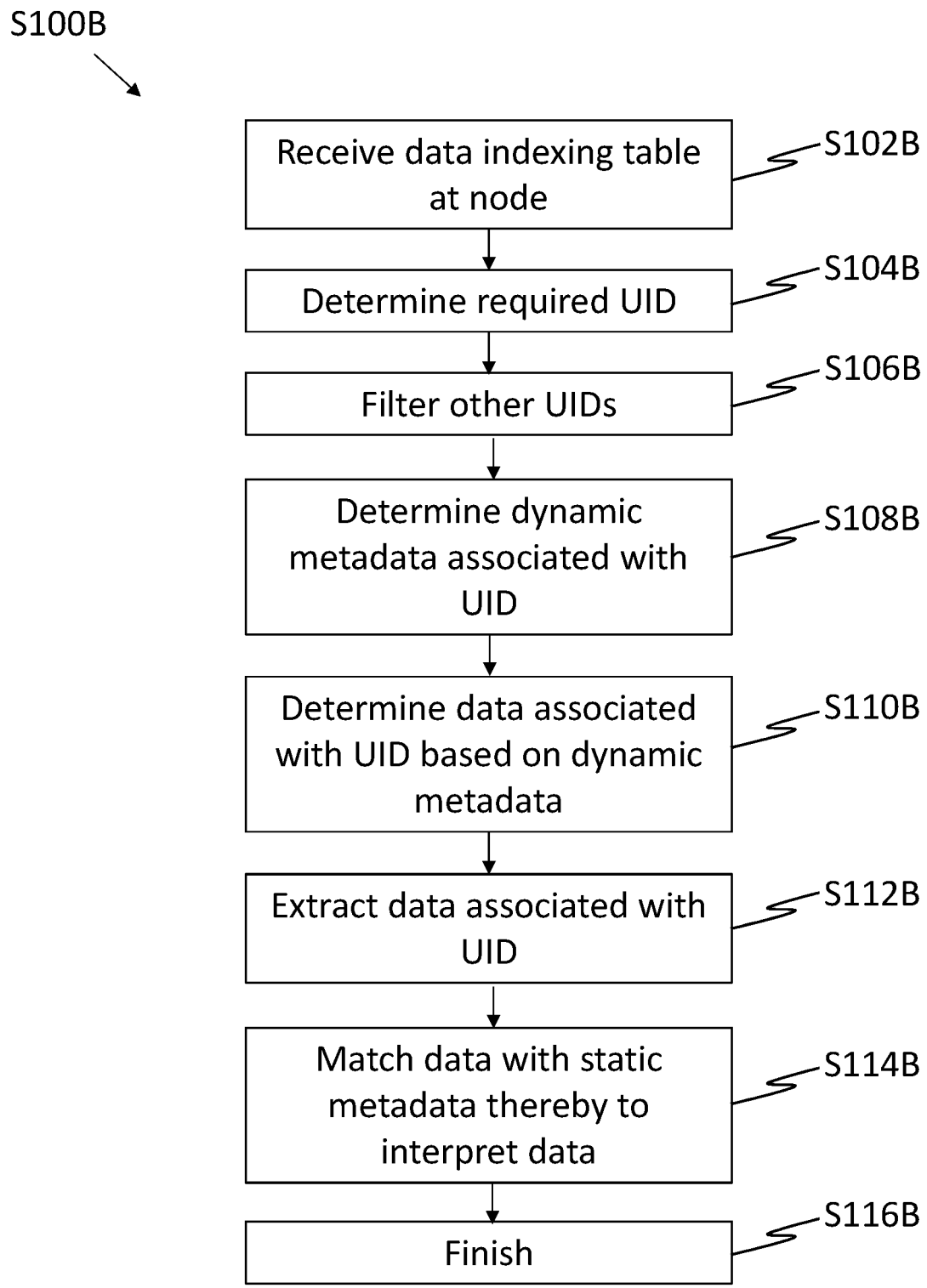
FIG. 5B is a flow diagram showing a process for receiving and extracting data at a node.

FIG. 5B is a flow diagram S100B showing a process for receiving a message and processing the relevant data within it. The process of FIG. 5B is implemented at a node in an avionics system, such as the first node 12, described in relation to FIG. 1A or FIG. 1B. The first node 12 is used to process a voltage measured at a control unit, such as the control unit that is the second node 14. The first node 12 may be used solely to monitor the voltage measured at the control unit, or to process it further to determine if it falls outside a predetermined range, thereby to send a signal, which, in an example, may be used to raise an alarm.

The process starts at step S102B, where a data indexing table, such as the data indexing table 30' of FIG. 4 is received at a node, such as the first node 12 of FIG. 1A or FIG. 1B. In this example, the device 14f of the second node 14 is the control unit that the first node 12 is required to monitor. The device 14f is monitoring equipment that includes a sensor that measures the voltage at the control unit 14 in the network 10. The voltage data is located in the data indexing table 30 in segment 32a' of the sixth row 34f. In this example, the control unit measures a voltage of 78 mV. Therefore a value of '78' is stored as data in the data indexing table 30' at the appropriate location. The second node 14 populates the data indexing table 30' with information that it measures, which, alternatively or additionally, includes further information relating to other measurements or inputs.

The second node 14 sends the data indexing table 30' to the first node 12 via the communication path 18 between the first communication interface 14c of the second node 14 and the first communication interface 12c of the first node 12.

Once the first node 12 has received the data indexing table 30', the first node 12 must then determine which of the UIDs contained in the data indexing table 30' the first node 12 is required to monitor and/or process. In the present example, the first node 12 is configured to output information relating to the control unit measurement made at the second node 14. The first node 12 determines locally the UID that it is interested in, in accordance with the configuration of FIG. 1A. Alternatively, the first node 12 synchronises with the server 24 to determine the UID that it is interested in, in accordance with the configuration of FIG. 1B. In the present example, the first node determines that it is subscribed to the UID is 5827. This information is stored locally in the memory 12b of the first node 12 and can be updated as required. The first node 12 uses this information to process an incoming data indexing table, such as the data indexing table 30' of FIG. 4 at step S104B.

Therefore, at step S104B, the first node 12 determines that it is interested in UID 5827, relating to the control unit voltage measured at the external device 14$f$ of the second node 14.

Once the first node 12 has identified that the UID 5827 is of interest, the process moves to step S106B, where any other unique identifiers in the data indexing table 30 are filtered or skipped by the first node 12, meaning that only information relating to UID 5827 is processed. The other UIDs are not subscribed to and therefore the information relating to the other UIDs is not processed by the first node 12. As each entry in the header has a fixed width it is possible to skip entries easily as soon as a UID is identified as not being of interest.

Accordingly, the first node 12 is arranged to parse the incoming data indexing table 30' and identifies the UID 5827.

The process then moves to step S108B, where the dynamic metadata associated with the required unique identifier is determined. In the present example, the first node 12 requires information relating to the unique identifier 5827, located in segments 32$a'$, 32$b'$, 32$c'$ of the second row 34$b'$ of the data indexing table 30'. The dynamic metadata that is represented by the unique identifier 5827 is located at segments 32$d'$, 32$e'$, 32$f$, 32$g'$ and 32$h'$ of the second row 34$b'$ of the data indexing table 30'. The first node 12 is configured to process message headers of a fixed structure. Therefore, once the first node 12 has identified the UID 5827, it knows directly where to look in the data indexing table 30' to find information relating to the status, length and offset in respect of the UID 5827. This provides improved processing efficiency.

Upon receipt of the data indexing table 30', the first node 12 determines at step S108B that there has been no change in the status of the reading of the control unit. This information is conveyed at segment 32$d'$ of the second row 34$b'$ of the data indexing table 30'. The first node 12 determines that the length of data is 8 bits. This information is conveyed at segments 32$e'$ and 32$f$ of the second row 34$b'$ of the data indexing table 30'. The first node 12 determines that the offset of the data in the data indexing table 30' is 320 bits. This information is conveyed at segments 32$g'$ and 32$h'$ of the second row 34$b'$ of the data indexing table 30'.

The dynamic metadata of the data indexing table 30 provides information that enables a node receiving the data indexing table 30 to identify relevant data in the data indexing table 30, based upon the UID. Accordingly, the UID for data 1 enables a node that is interested in data 1 to determine its status, length and offset.

Dynamic metadata changes over time and so must be communicated in real time. In the data centric method format, the information relating to the data position is dynamic, as it is the property of the network 10. The use of dynamic metadata means that there is no reliance on a predefined format or message addressing. Therefore, data may be packed in freely, and interpreted freely, based on the properties of the data and not of the network 10.

Once the dynamic metadata associated with the required unique identifier has been determined at step S108B, the process moves to step S110B. At step S110B, the location of the data associated with the required unique identifier (in this case, 78, associated with UID 5827), is determined. The dynamic metadata relating to UID 5827, as described above, enables the first node 12 to locate the position of the data '78' in the data indexing table 30. This is enabled because the first node 12 determines that the offset of the data is 328 bits in the data indexing table 30', which means that the data is located at the first segment 32$a'$ of the sixth row 34$f$ of the data indexing table 30'.

Once the data has been located, the process moves to step S112B, where the data is extracted by the first node 12, thereby providing information relating to the control unit of the external device 14$f$ at the first node 12. Whilst the information ('78') has been extracted, in isolation the information does not make sense. Therefore, the process then moves to optional step S114B, where the data that has been extracted at step S112B is matched with the relevant static metadata.

Static metadata, such as the encoding and the meaning of the data, does not change and is an intrinsic quality of the data to be transmitted in a message. If static metadata is not known, then data relating to that static metadata cannot be used. However, this is already known at the time when a system is designed and thus taken into account when designing a system. In the example of FIG. 2, the static metadata is related to a unique identifier (UID). The inclusion of the UID in the data indexing table 30 means that static metadata can be referenced, for example from a look up table that is stored locally, with a high efficiency. A look up table 200 with exemplary static metadata is shown at FIG. 3.

When the node 12 at step S114B of FIG. 5B matches data with static metadata sourced from a look up table, such as the look up table 200 of FIG. 3, the data received in the data indexing table is combined with the static metadata thereby to provide data in context. In the present example, data segment 32$a'$ at the sixth row 34$f$ of the data indexing table 30 is combined with the static metadata referenced in the look up table 200 to provide a reading of data as a voltage at the control unit measured in mV. The first node 12 is enabled to retrieve the static metadata relating the relevant UID(s). In the present case, the relevant UID is 5827. From the look up table 200, the first node 12 determines that the UID 5827 relates to the voltage at the control unit in mV. The result may be outputted at the external device 12$f$ of the first node 12, showing that the control unit is measuring a voltage of 78 mV. Alternatively or additionally, the result may be used for further calculations, or processes.

The process S100B then finishes at step S116B where the data is made available to the system or software which consumes it. The process S100B can be repeated, as necessary, to provide up to date information relating to the measurements that are being made. For example, in an avionics system, where certain parameters relating to aircraft need to be constantly monitored in real time, data messages can periodically be broadcast by a node and intelligently processed and filtered by appropriate nodes, as required.

Whilst the step of matching static data is shown at step S114B, the process for determining static metadata can be done before or after the data is extracted from the data message.

Whilst the first node 12 is described as synchronising with server 24 in order to determine which UIDs the first node 12 is subscribed to, alternatively, the first node 12 may be configured to control a list of subscribed UIDs locally. The list of subscribed UIDs may be fixed, or change over time.

Advantageously, every piece of data (e.g., data 1, data 2, data 3 and data 4 as described with reference to the data indexing table 30) is assigned a unique identifier (UID) at design time. In use, the data indexing table 30 of FIG. 2 may be sent between at least two of the nodes 12, 14, 16, shown at FIG. 1. Upon receipt of the data indexing table 30 any node 12, 14, 16 of the network 10, the receiving node 12, 14, 16 can parse the data indexing table 30 as a fixed lookup table and search for the UID of any data which is of interest at the receiving node 12, 14, 16, as described above with reference to FIG. 5.

Beneficially, the use of a CRC allows for the header to be provided with information that allows early detection of header faults.

The inclusion of a table length field makes it possible to predetermine the number of data in the message. Further, the use of a table length means that the message can iterate reliably and predictably, which is necessary, especially in the context of safety critical applications and of testability.

Advantageously, the use of a source relative time stamp at segments 32e, 32f, 32g and 32h of the first row 34a of the data indexing table 30 means that relative time calculations are allowed for each data, based on its source, rather than relying on a synchronised network time.

In addition, in time and safety critical networks, the timestamp shown in the header, and described in relation to segments 32e, 32f, 32g and 32h of the first row 34a for the data indexing table 30, is also dynamic metadata.

The status field provides information on the validity of the data. For example, the status may provide information relating to whether the data has changed or if it is outside of a predetermined range. Each UID of the data of the table has a data status that is related to it.

The ALIC provides a check sum on the overall message, thereby to check the integrity of the message.

In a further example, both the first node 12 and the third node 16 have an interest in the information measured at the monitoring equipment that is the external device 14f of the second node. The second node 14 broadcasts a data indexing table 30 to the other nodes 12, 16 in the network 10. Each of the first node 12 and the third node 16 parse the data indexing table 30 in order to retrieve data 1, by identifying the UID that has been assigned to data 1.

Beneficially, any UID of interest that has an associated data offset can be used to extract the data from the data area of the data indexing table 30. As the data position is only reliant on the data indexing table 30 there is no longer any reliance on the order or layout of the data.

Advantageously, the use of a fixed alignment and fixed indexing data table 30 as shown in FIG. 2 provides a greater efficiency in modern processors or in control of chips.

Further, beneficially, Byte alignment and word alignment also improves computational efficiency and makes it possible to makes it possible to parallelise processing, therefore processing the data indexing table 30 at extremely fast speeds to find the relevant data. As all fields proposed are encoded as direct integers or binary identifiers there is no additional decoding layer reducing the processing demands.

DCMF, as described with reference to the data indexing table 30 of FIG. 2, uses a UID to create a form of addressing data, independent of the network. The only requirement on the network 10 is that the data gets from where it is produced to where it is needed. It is possible to apply a global broadcast to the network 10, allowing all nodes to receive all messages. Each node, such as the nodes 12, 14, 16 of FIG. 1, filter out the data that is needed locally. This type of networking allows large messages with much data per message to be communicated. This makes DCMF compatible with hub based networks or bus networks which have little or no routing or switching behaviour and have lower complexity.

There is no need for any message ID or network addressing concept, the data indexing table is the only header required when sending a message. This simplifies the network management to require only a physical layer and the DCMF on top and also allows nodes 12, 14, 16 in a network 10 to be agnostic to the presence, topology or locations of any other node on the network, provided the UIDs required are received from somewhere in the network. This means nodes can treat the entire network and all nodes in the network as a source of data with low coupling and easy integration of new data. The small number of features maintains the lower cost of testing this flexibility and simplifies modelling of the network.

It is also possible to apply the data centric message format as an application level format encapsulating it inside the payload of an existing network, so it can be retrofitted onto existing networks. Providing the network achieves the required message distribution, this allows all the same features as the DCMF except for the network efficiency of a reduced stack.

This minimum mechanism allows a simpler, cheaper and less complex interface to be implemented, when compared to existing technologies. Further, there are less restrictions applied to the payload.

Figure 6:
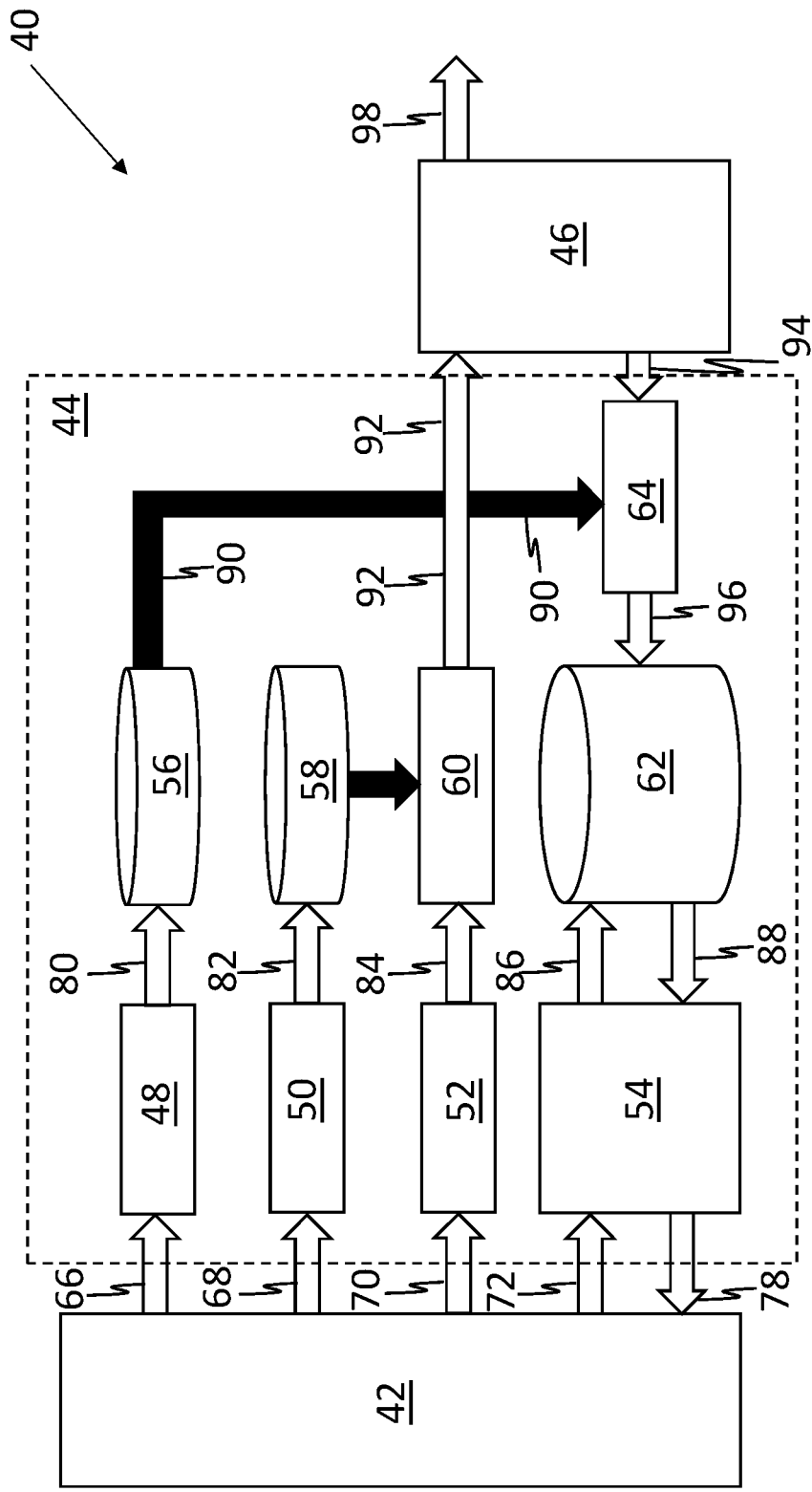
FIG. 6 shows an architectural design of a network interface in accordance with an embodiment of the invention.

An example of the implementation of DCMF software is shown in relation to FIG. 6.

FIG. 6 shows an architectural design of a network interface 40 illustrating the implementation of the invention at a software interface 44. Such an implementation may be the software implementation of the process S100B described with reference to FIG. 5B, above. The software interface 44 may be implemented at a node, such as the first node 12 of the avionics system network 10 of FIG. 1. The software interface 44 is in communication with software 42 and communication hardware 46. The software 42 may be stored in the memory 12b of the first node 12, for example, and the communication hardware 46 may form part of the first interface 12c of the first node 12.

The software interface 44 comprises ID filters 60, 64, a database of subscribed IDs 56, a database of registered IDs 58, a database of the latest data 62, a subscribe function 48, a register function 50, a push function 52 and a get function 54. The features of the software interface 44 are arranged to process data flowing to and from both the software 42 and the communication hardware 46 as described below.

The software 42 is configured to determine which UIDs the node that implements the process flow 40 is subscribed to. This information is input via the software 42 data path 66 through the subscribe function 48, which passes the information via data path 80 to the database of subscribed IDs 56.

When a message is received at a node that is implementing the process flow 40, the message is processed. The message includes a data indexing table, such as the data indexing table 30 of FIG. 2, which is sent by the communication hardware 46 to the software interface 44 via data path 94, the ID filter 64 determines whether the incoming message contains an UID that is of interest. This is determined at the ID filter 64 by comparing the incoming UIDs with the subscribed IDs stored in the database of subscribed IDs 56. Information relating to any UID of interest is then passed via data path 96 to the database of latest data 62. Accordingly, relevant incoming information is filtered at the software interface 44.

Once the latest data received from the communications hardware 46 has been stored in the database of latest data 62, the software interface is able to extract the desired data. The software 42 is configured to request data relating to a particular UID using the get function 54, via data paths 72 and 86. Accordingly, the get function 54 causes the relevant data to be extracted from the database of latest data 62 and be passed to the software via data paths 88 and 78. The extracted information may include data and the status of the data and any relevant timestamps, which can be processed as required.

The software 42 is further configured to transmit data. The software 42 is configured to register the UIDs of items of data via the register function 50. The information is inputted via data flow paths 68 and 82 and stored in the database of registered IDs 58.

When a node that implements the software 42 is configured to output data, the data, a UID and status is sent using the push function 52 of the software interface. The data, UID and status are sent via paths 70 and 84 to ID filter 60. The ID filter 60 compares the UID of the pushed data with the UIDs registered in the database of registered IDs. In the event that the UID is registered, the data and status is assembled into a data indexing table with the UID and the resulting length/offset information and then sent via data path 92 to the communication hardware 46, which directs the data indexing table to another location via data path 98. The field that the filter 60 or the communication hardware 46 may include traffic shaping or scheduling behaviours. Due to this there may be several UID/Data/Status sets sent to the filter 60 before they are put into a single data indexing table and sent in a single transmission. Advantageously this allows a more network optimised control of transmission and packet sizing, while the interface 44 decouples the software 42 from this behaviour. If the UID is not registered, it is blocked by the filter and not transmitted.

Whilst the process flow 40 above is described without reference to any message protocol that precedes the data indexing table 30, the software interface 44 is configured to support protocol based data (such as fragmentation and reassembly of a large datum across several data indexing tables, or a transmission with acknowledgement) and, in further examples, non-protocol based data (such as publishing a single datum without any form of acknowledgement, or periodically sending a time variant data point). In yet further examples, the software interface 44 is configured to support Remote Direct Memory Access (RDMA) or block or dispersed data, as well as stream based data.

The software interface 44 is shown to be implemented in software, however, alternatively, the software interface is implemented in hardware. The use of a hardware approach typically provides higher speeds and better efficiency, if the network stack is reduced and the DCMF is being used directly as a transport layer.

The software 42 of FIG. 6 is software that directly accesses the software interface 44. However, alternatively, the software 42 is a processor interfacing to a hardware end system, a data base front end, an RDMA access controller or an embedded real-time controller. The software 42 and the interface 44 are shown as separate features, however, alternatively, the software 42 and the interface 44 are embedded onto a single device.

Whilst the process flow 40 is described with reference to implementation at the first node 12 of the network 10 of FIG. 1, alternatively, the process flow 40 can be implemented at any node in a network 10.

Whilst the process flows in respect of FIGS. 5A, 5B and 6 are described with reference to an avionics network, the processes can be applied to other networks including being applied to distributed computing.

Figure 7:
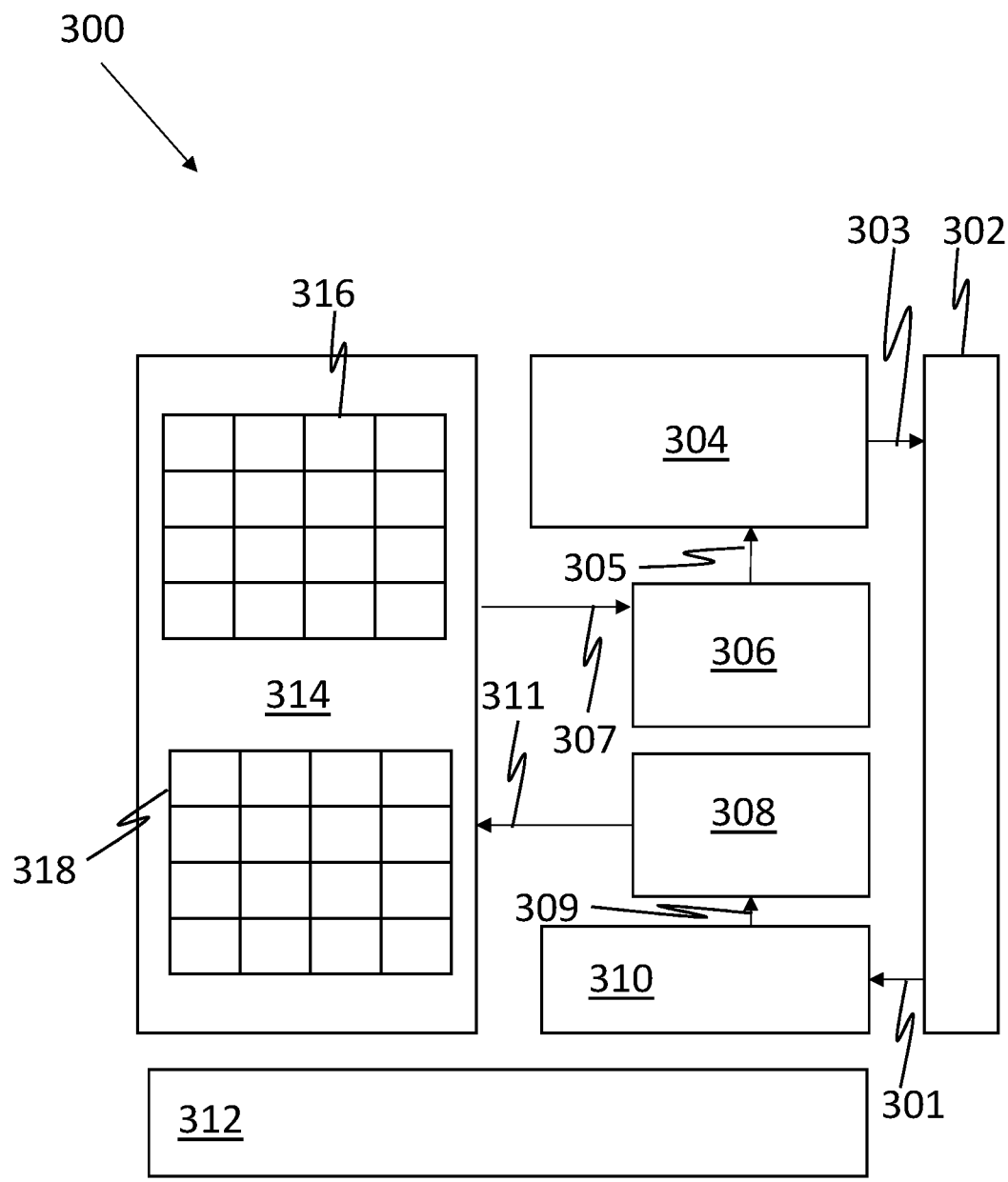
FIG. 7 is a schematic of a node.

FIG. 7 shows a node 300. The node 300 has an application component 302, subscribe module 304, receive module 306, send module 308, publisher module 310, software module 312 and local memory/mailbox/buffers 314. Data messages 316, 318 are processed by the node 300. The node 300 is shown to have different components and the term 'node' is used to cover any combination of hardware, software and any application. The node 300 is a node such as the nodes 12, 14, 16 of FIGS. 1A and 1B. The functionality described with reference to FIG. 7 is performed at one integrated location. Alternatively and additionally, nodes are split to operate with functionality performed at different locations, such that the hardware receiving messages is separate from the application used to understand and/or manipulate the data messages 316, 318.

Beneficially, a node that has been used to process a first data message can be configured to process a second data message containing at least one data type identifier in common with a first data message. In the second message the dynamic metadata may be different to the dynamic metadata of the first message. If the dynamic metadata of the second message differs from the dynamic metadata of the first message such that the data content associated with the common data type identifier in the first message is at a different position in the first data message compared to the position of the data content associated with the common data type identifier in the second data message, the node is able to use the dynamic metadata to locate the data content associated with the common data type identifier in both the first data message and the second data message and use the same static metadata data to interpret the retrieved data content associated with the common data type identifier from both the first and second data messages, regardless of the position of the data content in each of the first and second data messages.

Advantageously, the data indexing table 30, described above in relation to FIGS. 1 to 6, is implemented in an avionic network. Such implementation allows for real-time monitoring of data. Typically, avionics network systems work with small data and primitive types, such as single integers, or even Boolean integers, coming from sensors or commanding actuators. The implementation the data indexing table 30 in an avionic network means that real-time data can be managed in an efficient manner. In further examples, the data indexing table 30 is implemented in other types of network outside avionics systems and bring at least some of the advantages described herein.

Beneficially, the use of a data indexing table 30 with UIDs and timestamps means that all information in a network is recorded and logged. Whilst only relevant information is extracted by a node based on the UID, there is full visibility of the entire network. This means that diagnosing problems in a network is more easily carried out.

Further, by assigning a unique identifier to each item of data, a level of obfuscation is provided, as only the nodes that know of the unique identifier are able to extract and interpret the information. This means that the party assigning the unique identifiers is able to control third parties' ability to interpret data in a network where data indexing tables are sent with the same information to every node. One practical application is the control of visibility of data from different aircraft in an avionics network and while other data may be recorded it cannot be utilised without the knowledge of the static metadata. This is particularly true if this data is not stored on a server aboard the aircraft but exists only during the design phases of the software.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising an avionics system comprising a first node and a second node,
wherein the first node is arranged to transmit to the second node a data message comprising:
a data identifier,
dynamic metadata associated with the data identifier, and
data content;
wherein the second node is arranged to receive the data message from the first node and, in response to receiving the data message from the first node, the second node is arranged to:
locate and read the data identifier within the data message;
locate and read the dynamic metadata associated with the read data identifier; and
retrieve the data content from a determined position in the data message,
wherein the data message contains data identifiers and each of the data identifiers is associated with dynamic metadata and data content, and the second node is arranged only to locate and read the data identifiers and the dynamic metadata and retrieve the data content in relation to a subset of the plurality of data identifiers, such that data content associated with one or more of the data identifiers that are not part of the subset is not processed by the second node.

2. An aircraft according to claim 1, wherein the second node is configured to use the dynamic metadata to determine the position in the data message of the data content.

3. The aircraft according to claim 1, wherein the dynamic metadata includes an offset value indicating an offset of the data content, and the second node is configured to use the offset value to determine the position in the data message of the data content.

4. The aircraft according to claim 1, wherein the dynamic metadata includes a length indicating a length of the data content, and the second node is configured to use the length to determine the position in the data message of the data content.

5. The aircraft according to claim 1, wherein the dynamic metadata includes an offset value indicating an offset of the data content, the dynamic metadata includes a length indicating a length of the data content, and the second node is configured to use the offset value and the length to determine the position in the data message of the data content.

6. A computer implemented method for communication in an avionics network comprising:
transmitting, from a first node to a second node, a data message comprising a data identifier, dynamic metadata associated with the data identifier and data content;
receiving, at the second node from the first node, the data message;
at the second node, locating and reading the data identifier within the data message;
at the second node, locating and reading the dynamic metadata associated with the read data identifier; and
at the second node, retrieving data content from a determined position in the data message, wherein the data message contains data identifiers each associated with dynamic metadata and data content, and
the method further comprises only performing the locating, reading and retrieving steps in relation to a subset of the data identifiers, and discarding the data content associated with one or more data identifiers that are not part of the subset.

7. The computer implemented method according to claim 6, further comprising, at the second node, using the dynamic metadata to determine the position in the data message of the data content.

8. The computer implemented method according to claim 6, wherein the dynamic metadata includes an offset value indicating an offset of the data content, and the method further comprises: at the second node, using the offset value to determine the position in the data message of the data content.

9. The computer implemented method according to claim 6, wherein the dynamic metadata includes a length indicating a length of the data content, and the method further comprises: at the second node, using the length to determine the position in the data message of the data content.

10. The computer implemented method according to claim 6, wherein the dynamic metadata includes an offset value indicating an offset of the data content, the dynamic metadata includes a length indicating a length of the data content, and the method further comprises: at the second node, using the offset value and the length to determine the position in the data message of the data content.

11. A method of communication between a first node and a second node in an avionics network, the method comprising:
transmitting from the first node to the second node a data message comprising data identifiers and, associated with each of the data identifiers dynamic metadata and data content;
receiving the data message at the second node;
at the second node, locating and reading the data identifiers within the data message;
at the second node and for the data identifiers within a subset of the data identifiers, reading the metadata and determining at least one position in the data message corresponding to the data content associated with the data identifiers within the subset of the data identifiers, and
at the second node and for each of the data identifiers within the subset of data identifiers, using the determined at least one position to locate and retrieve the data content associated with the data identifiers within the subset of the data identifiers,
wherein the second node does not process the data content in the data message associated with each of the data identifiers not part of the subset of data identifiers.

* * * * *